United States Patent
Nakamura (10) Patent No.: US 7,756,697 B2
(45) Date of Patent: Jul. 13, 2010

(54) EMULATOR AND EMULATING METHOD FOR ADJUSTING THE EXECUTION TIMING OF INSTRUCTIONS INCLUDED IN AN APPLICATION TO BE EMULATED

(75) Inventor: Koji Nakamura, Kanagawa (JP)

(73) Assignee: Sony Corporation Entertainment Inc., Tokyo (JP)

( * ) Notice: Subject to any disclaimer, the term of this patent is extended or adjusted under 35 U.S.C. 154(b) by 905 days.

(21) Appl. No.: 11/475,044

(22) Filed: Jun. 27, 2006

(65) Prior Publication Data

US 2007/0010988 A1    Jan. 11, 2007

(30) Foreign Application Priority Data

Jun. 27, 2005 (JP) .............................. 2005-187104

(51) Int. Cl.
G06F 9/455 (2006.01)
G06F 9/44 (2006.01)
(52) U.S. Cl. ......................................... 703/23; 717/134
(58) Field of Classification Search .................. 703/23; 717/134, 135
See application file for complete search history.

(56) References Cited

U.S. PATENT DOCUMENTS

| | | | | |
|---|---|---|---|---|
| 4,727,491 A | * | 2/1988 | Culley | 703/23 |
| 5,125,088 A | * | 6/1992 | Culley | 713/400 |
| 5,313,621 A | * | 5/1994 | Chan | 710/48 |
| 5,617,576 A | * | 4/1997 | Solari et al. | 712/40 |
| 6,672,963 B1 | * | 1/2004 | Link | 463/43 |
| 6,882,968 B1 | * | 4/2005 | Linden | 703/26 |
| 6,952,825 B1 | * | 10/2005 | Cockx et al. | 718/102 |
| 7,222,063 B2 | * | 5/2007 | Yutaka | 703/24 |
| 2002/0052728 A1 | * | 5/2002 | Yutaka | 703/26 |

* cited by examiner

Primary Examiner—Dwin M Craig
(74) Attorney, Agent, or Firm—Matthew B. Dernier, Esq.; Gibson & Dernier LLP (57) ABSTRACT

An emulation technique adjusts the execution timing of instructions included in an application to be emulated. An emulator executes an instruction stream consisting of a plurality of instructions included in the application for an apparatus to be emulated to perform the object AP. This emulator performs successively the instructions included in the instruction stream at a predetermined period, and includes a speed controller for adjusting the emulation speed by intermittently inserting a wait into the instruction stream to emulate execution of the instruction stream. Preferably, this emulator includes a clock generator (145), in which the speed controller counts the clock input from the clock generator (145).

7 Claims, 5 Drawing Sheets

EMULATOR AND EMULATING METHOD FOR ADJUSTING THE EXECUTION TIMING OF INSTRUCTIONS INCLUDED IN AN APPLICATION TO BE EMULATED

CROSS REFERENCE TO RELATED APPLICATION

The present application claims priority from Japanese Application No. 2005-187104 filed Jun. 27, 2005, the disclosure of which is hereby incorporated by reference herein in its entirety.

BACKGROUND OF THE INVENTION

1. Field of the Invention

The present invention relates to an emulation technology used in an information processing apparatus such as an entertainment apparatus, and more particularly to an improved method for enabling application software developed for a certain information processing apparatus to be appropriately executed in another information processing apparatus.

2. Description of the Related Art

A conventional information processing apparatus can naturally execute an application corresponding to architecture of the information processing apparatus. However, it may be difficult for that same information processing apparatus to execute an application for an information processing apparatus corresponding to another architecture.

In recent years, the evolution of information processing has been remarkable such that a first generation architecture capable of fast processing has been put into practical use, and accepted by many users, yet subsequent generation architectures capable of still faster processing often appear very soon after the first widely accepted generation.

If there is no compatibility between the existent architecture and a new architecture, an application operable with the existent architecture cannot be executed on the information processing apparatus in accordance with the new architecture. To prevent such software resources from becoming obsolete, and seamlessly accept the new architecture, there is demand for information processing apparatuses corresponding to the new architecture to maintain backward compatibility with the existent architecture.

In this case, the information processing apparatus adopting a certain architecture is operated as an emulator for emulating the information processing apparatus having a different architecture (hereinafter an "object apparatus"), in which the compatibility is maintained by executing the application software (hereinafter an "object AP") for this object apparatus.

As an example of upward compatibility, a PlayStation (registered trademark) and a PlayStation2 (registered trademark) as its succeeding machine are well known.

The PlayStation2 adopts a different architecture from the PlayStation, but emulates the architecture of the PlayStation on the PlayStation2 to maintain upward compatibility.

In this emulation, the information processing apparatus is usually operated as the emulator, in which an execution environment for the object apparatus intrinsically scheduled to execute the object AP is implemented by software, hardware or a combination thereof.

More specifically, if the object apparatus comprises devices including a CPU, a sound processor, a graphic processor and the like, these devices may be all formed by software in the emulator to perform the emulation. On the other hand, the emulator may emulate by software, for example, the CPU and the graphic processor among the devices for the object processing apparatus, and emulate by hardware the sound processor, using a sound processor for the emulator. In this manner, the emulation may be made by combination of software and hardware.

When the emulation is made, the execution timing of the instruction executed in the emulator may not be coincident with the intrinsically scheduled execution timing, depending on the combination of instructions included in the object AP, possibly resulting in a nonconformity. Accordingly, it is necessary to adjust the execution timing of the instructions included in the object AP.

When the emulator performs all the emulation by software, all the devices for the object apparatus emulated by software are operated at the timing generated from one software clock in the emulator. Accordingly, since each device to be emulated operates by referring to the same clock, there is less risk that the execution timing of instructions included in the object AP deviates from the intrinsic execution timing.

On the other hand, when a part of the emulation is performed by hardware, the clock referred to by the hardware may be different from the software clock referred to in the emulation by software. Accordingly, when a certain instruction is executed, the device may be ready for executing the instruction or the device may be unready for executing the instruction, depending on the device to be emulated, because the devices to be emulated have different clocks. If the device which executes the instruction is not ready for executing the instruction, normal emulation cannot be performed.

For example, when the sound processor among the devices for the object apparatus to be emulated is emulated by hardware of the emulator, and the CPU is emulated by software, the CPU emulated by software is timed by the software clock. On the other hand, since the sound processor refers to the clock of the hardware clock system mounted in the emulator, the clock system of the sound processor to be emulated is different from the software clock in the CPU to be emulated by software.

Also, when a plurality of devices is emulated by software, the devices to be emulated may not necessarily operate at the same software clock. Among the devices to be emulated by software, some devices operate in the first software clock system, and the other devices operate in the second software clock.

In this manner, when the instruction included in the object AP is executed by the emulator, it is necessary to perform the emulation after the device which executes the instructions among the devices to be emulated becomes ready for executing the instructions.

In the light of the above circumstances, it is an object of the invention to provide an emulation technique that can adjust the execution timing of instructions included in the object AP to be emulated.

Also, it is another object of the invention to provide an emulation technique that can adjust the execution timing of instructions included in the object AP, when each device for the object apparatus to be emulated operates at a different clock.

Also, it is another object of the invention to provide an emulation technique that can adjust the execution timing of instructions included in the object AP, when a plurality of devices for the object apparatus are emulated by software.

Also, it is another object of the invention to provide an emulation technique that can adjust the execution timing of instructions included in the object AP, when a combination of software emulation and hardware emulation is employed for emulation.

BRIEF SUMMARY OF THE INVENTION

In order to accomplish the above object, the present invention provides an emulator for executing an instruction stream consisting of a plurality of instructions included in an application (hereinafter an "object AP") for an apparatus to be emulated (hereinafter an "object apparatus") to perform the object AP, in which the object apparatus performs successively the instructions included in the instruction stream at a predetermined period, the emulator comprising a speed controller for adjusting the emulation speed by emulating execution of the instruction stream by the object apparatus and intermittently inserting a wait into the instruction stream to emulate execution of the instruction stream.

Thus, the emulation speed of the instruction stream by the object apparatus can be adjusted finely by intermittently inserting the wait. Preferably, the insertion frequency of wait is decided so that the emulation speed may approach the intrinsic execution speed of the object AP in the object apparatus.

As will be apparent from the above explanation, with the invention, there is the favorable effect that the processing ability of the information processing apparatus can be correctly adapted to the object AP.

DETAILED DESCRIPTION OF THE INVENTION

An embodiment of an emulator according to the present invention will be described below with reference to the drawings by way of example using an entertainment apparatus as an information processing apparatus operable as an emulator. In the following explanation, it is supposed that the entertainment apparatus is a higher performance machine and an object apparatus to be emulated is a lesser performance machine in this embodiment.

<Higher Performance Machine>

Figure 1:
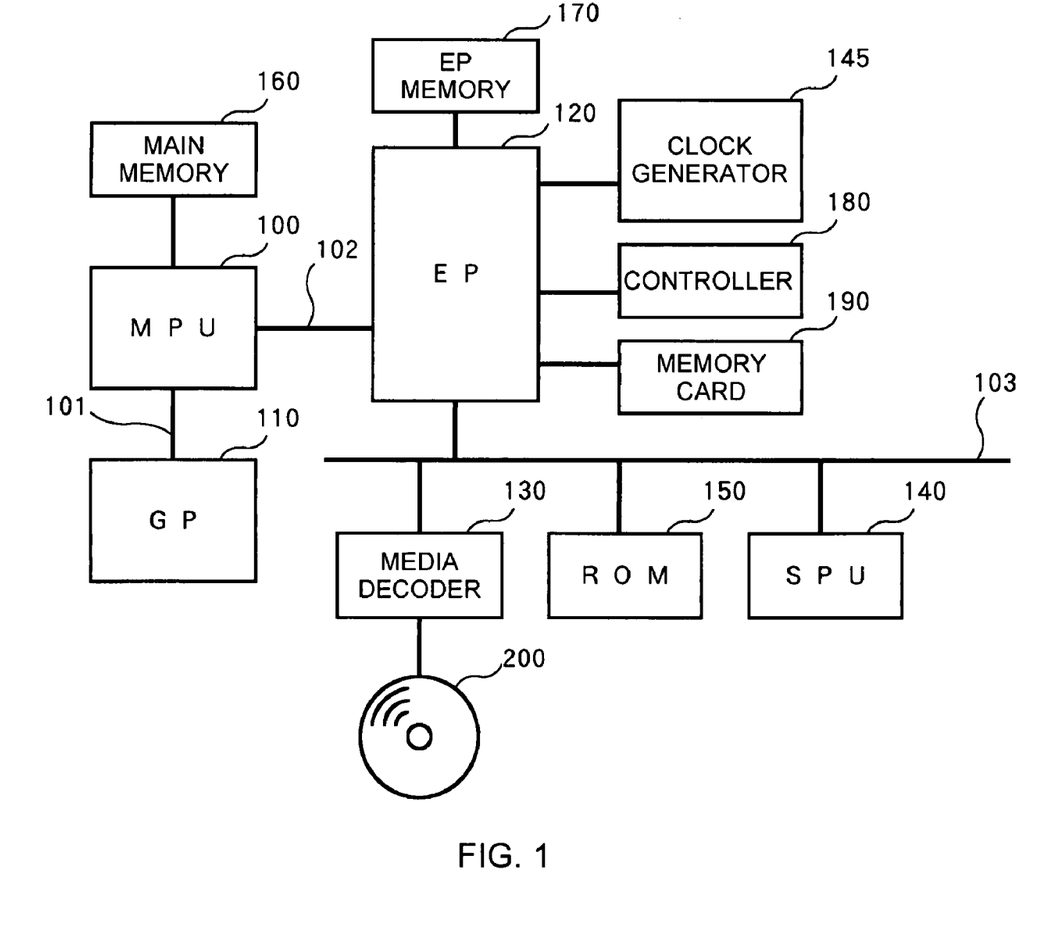
FIG. 1 is a schematic block diagram of a higher performance machine shown in this embodiment.

FIG. 1 is a block diagram of the essence of the entertainment apparatus operable as the emulator according to the present invention. In this entertainment apparatus, an MPU (micro processor unit) 100 and a GP (graphical processor) 110 are connected via a dedicated bus 101, the MPU 100 and an emulate processor EP (emulate processor) 120 are connected via a bus (SBUS) 102, and further, a media decoder 130 for reading the software or the like from the media, an SPU (sound processor unit) 140 as sound processing means and a ROM (read only memory) 150 are connected to the EP 120 via a bus (SSBUS) 103. A clock generator 145 for generating the operating clock of the entertainment apparatus is connected to the EP 120. The MPU 100 includes a main memory 160, and the EP 120 includes an EP memory 170. A controller 180 and a memory card 190 are further connected to the EP 120. In this embodiment, the clock from the clock generator 145 is 440 MHz, and the operating clock of the emulate processor EP 120 is also 440 MHz.

A basic function of the MPU 100 is to perform a predetermined process by executing various kinds of programs stored in the ROM 150 or an object AP loaded from the media 200 such as a CD or a DVD into the main memory 160. The GP 110 is a graphics processor taking charge of a drawing processing function of this entertainment apparatus. Specifically, it performs a drawing process for the object AP in accordance with an instruction from the MPU 100.

The EP 120 is an input/output processor for controlling the transaction of data between the MPU 100 and the peripheral devices (media decoder 130, SPU 140 and the like), and emulates the CPU or the like of the lesser performance machine to be emulated when the higher performance machine is operated as the emulator. The media decoder 130 reads the data from the media 200 and transfers the data to the main memory 160.

The SPU 140 is a sound reproducing processor that reproduces the compressed waveform data stored in a sound buffer (not shown) at a predetermined sampling frequency, based on an utterance instruction from the MPU 100 or the like. The SPU 140 switches the operation between an emulation mode and a normal mode. That is, in the emulation mode, the SPU 140 operates in the same manner as an SPU 240 of the lesser performance machine which will be described below. On the other hand, in the normal mode, the SPU 140 operates as sound processing means having higher performance than the SPU 240. Accordingly, the SPU 140 is an upward compatible apparatus of the SPU 240.

The ROM 150 is a read only memory storing the program that the MPU 100 or the EP 120 executes at the starting time. The ROM 150 separately stores the program shared between the MPU 100 and the EP 120 and the program dedicated for each processor. The main memory 160 and the EP memory 170 function as the working memory for the MPU 100 and the EP 120. A controller 180 is an interface for transmitting an intention of the player to the application or the like during the execution of a game or the like.

The memory card 190 is a rewritable, portable, non-volatile secondary recording medium that stores the processing result of the process performed by the MPU 100, the set information and the like.

In this embodiment, it is supposed that the media 200 are unrewritable portable recording media. This media 200 store the program, the data and the like required in executing the program. These data include a code for discriminating whether or not the media 200 stores the data for the higher performance machine or the lesser performance machine.

<Lesser Performance Machine>

Figure 2:
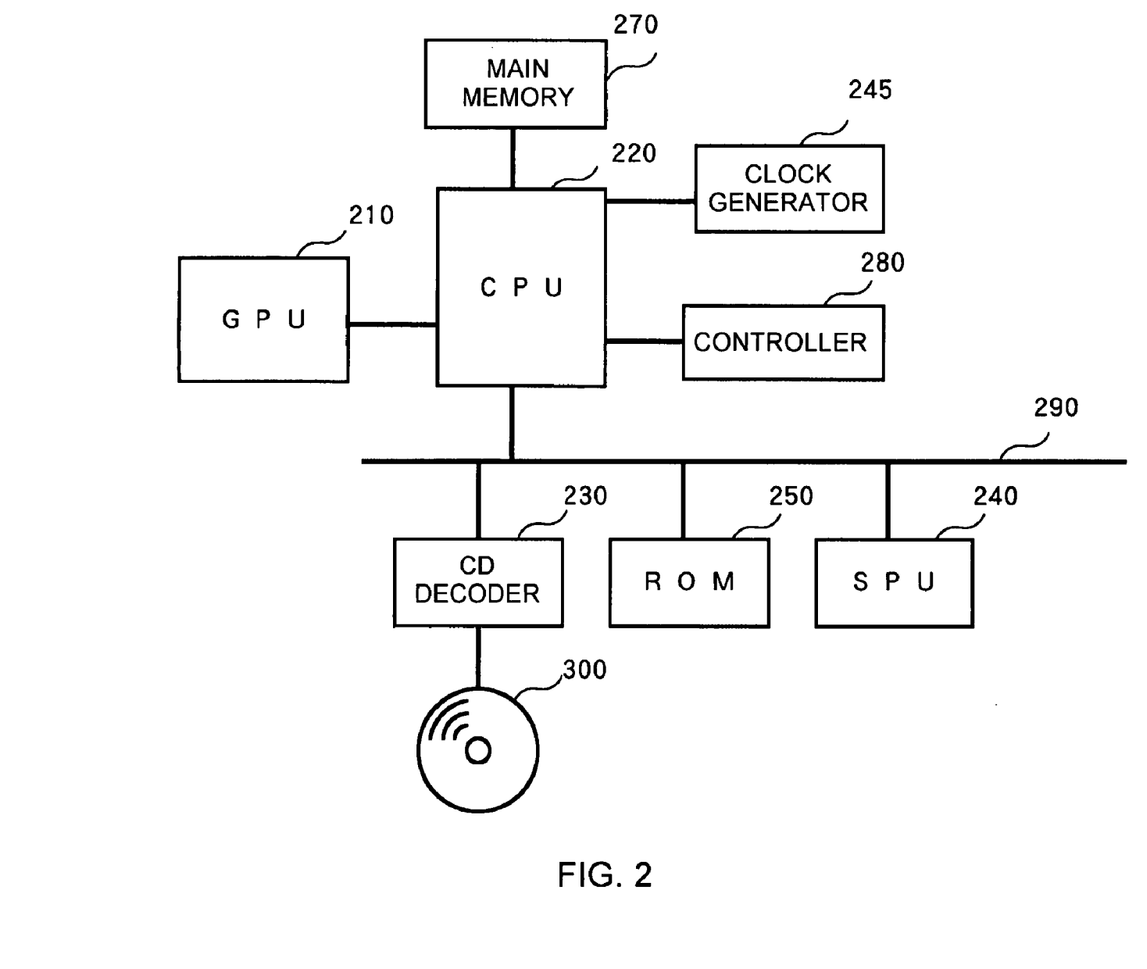
FIG. 2 is a schematic block diagram of a lesser performance machine shown in this embodiment.

An entertainment apparatus that is the lesser performance machine for the entertainment apparatus of FIG. 1 will be outlined below. In this entertainment apparatus as shown in FIG. 2, a GPU (graphic processor unit) 210 and a controller 280 are connected to a CPU (central processor unit) 220 having a main memory 270, and a CD decoder 230, the SPU 240 and a ROM 250 are further connected via a bus 290 to the CPU 220. A basic function of the CPU 220 is to perform a predetermined process by executing a program stored in the ROM 250 or a program loaded from the CD 300 into the main memory 270. The operation frequency of the CPU 220 is lower than that of the EP 120 for the higher performance machine.

Accordingly, assuming that the value of "[operation frequency of the EP 120]/[operation frequency of the CPU 220]" is a cycle constant C, the MPU of the higher performance machine performs a processing of 1×C clocks, while the CPU of the lesser performance machine performs a processing of one clock. Accordingly, when the higher performance machine operates as the emulator, the emulation can be made at the normal speed by performing a processing of one clock in the lesser performance machine for a processing of C clocks in the higher performance machine. In this embodiment, the value of the cycle constant is 12. The GPU 210 is a graphics processor for performing a drawing process in accordance with an instruction from the CPU 220. The GPU 210 has a CRTC function for image display and a polygon drawing function for a frame buffer (not shown). The CD decoder 230 reads the recording information from a CD 300, and transfers it to the main memory 270. The ROM 250 stores the program executed by the CPU 220 at the starting time or the like. A clock generator 245 for generating the operating clock of the entertainment apparatus is connected to the EP 120.

The higher performance machine emulates the lesser performance machine with the above configuration. In this embodiment, the GPU 210, the CPU 220 and the clock generator 245 of the lesser performance machine are emulated by software in the higher performance machine, and the SPU 240 is emulated by hardware for the SPU 140 in the higher performance machine. In the higher performance machine, a partial area of the EP memory 170 is allocated to the main memory of the lesser performance machine. The contents of the ROM for the lesser performance machine are incorporated in the ROM for the higher performance machine. The controller 280 of the lesser performance machine is substituted by the controller 180 of the higher performance machine. In this manner, the higher performance machine can read and execute the object AP operable on the lesser performance machine by performing the emulation in the higher performance machine.

<Speed Controller>

Figure 3:
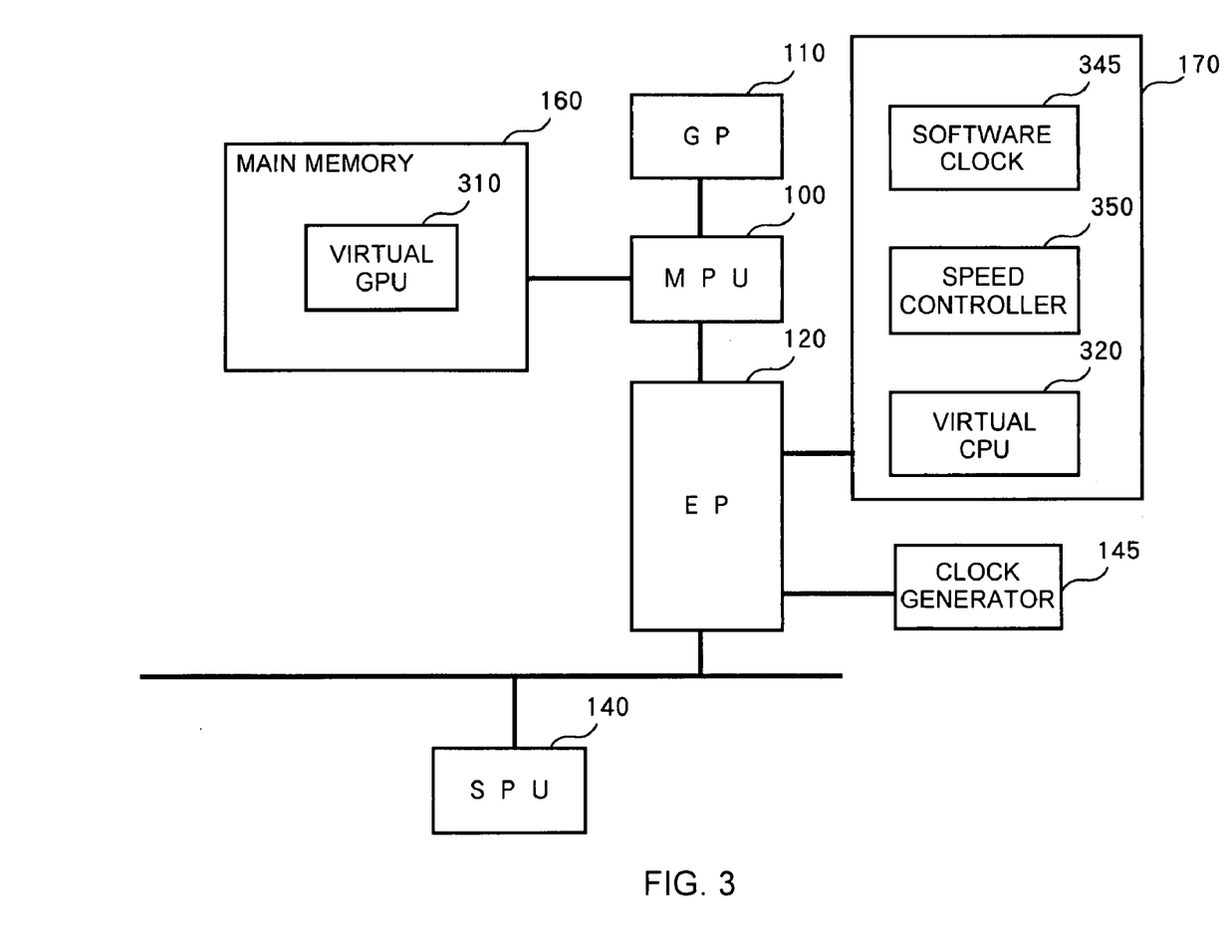
FIG. 3 is an explanatory diagram for a virtual CPU or the like constructed in a main memory of the higher performance machine.

In the higher performance machine, a virtual CPU 320, a software clock 345 and a speed controller 350 are formed within the EP memory 170 to execute the object AP that essentially operates on the lesser performance machine, as shown in FIG. 3. The virtual CPU 320 thus formed operates like the CPU 220 of the lesser performance machine. A software clock 345 is generated by referring to the clock from the clock generator 145 of the higher performance machine. Also, in this embodiment, the speed controller 350 is formed in the main memory 160 of the higher performance machine to adjust the execution timing of instructions included in the object AP.

Moreover, a virtual GPU 310 is constructed in the main memory 160 by the MPU 100 and the GP 110. In this manner, two devices of the virtual CPU 320 and the virtual GPU 310 are emulated by software in this embodiment.

Figure 4:
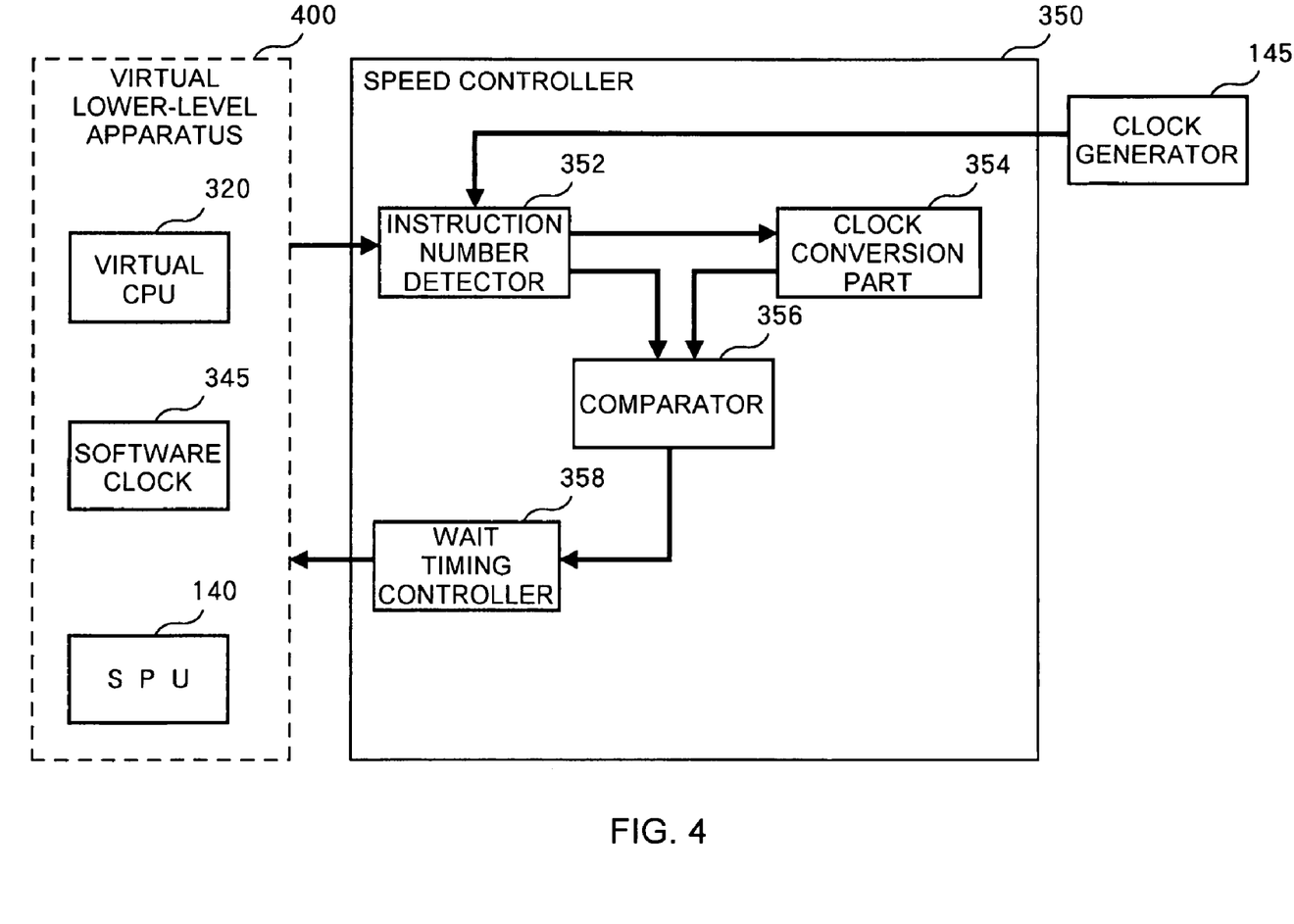
FIG. 4 is an explanatory diagram for a speed controller.

The speed controller 350 will be described below. The speed controller 350 comprises an emulate instruction number detector 352, a clock conversion part 354, a comparator 356, and a wait timing controller 358, as shown in FIG. 4.

The instruction number detector 352 detects the number "n" of instructions executed in the emulated lesser performance machine 400 (hereinafter referred as a virtual lesser performance machine), and sends its result to the comparator 356. Also, the instruction number detector 352 detects the number of clocks in the clock generator 145 while the instructions are executed in the virtual lesser performance machine (specifically from the previous time of wait insertion to the end of executing the number "n" of instructions in the virtual lesser performance machine) by referring to the clock from the clock generator 145 of the higher performance machine.

In the lesser performance machine of this example, it is supposed that one instruction is processed by one clock. Accordingly, the number of instructions processed by the virtual lesser performance machine is equal to the number of clocks in the virtual lesser performance machine.

Ideally, one clock in the virtual lesser performance machine corresponds to 12 clocks in the higher performance machine, whereby the time taken to process n instructions in the virtual lesser performance machine=n clocks in the lesser performance machine=12n clocks in the higher performance machine. However, when the instructions included in the object AP are executed in the virtual lesser performance machine, it may or may not take a long time to make the emulation, depending on the instruction, whereby the above expression may not necessarily hold. This means that the emulation is not correctly made, whereby there is a risk that the nonconformity may possibly occur.

The speed controller 350 adjusts the time taken to make the emulation. Therefore, the instruction number detector 352 sends the number "n" of instructions executed in the virtual lesser performance machine to the comparator 356, and sends the number of clocks from the clock generator 145 of the higher performance machine from the previous time of wait insertion to the end of executing the number "n" of instructions in the virtual lesser performance machine to the clock conversion part 354. The clock conversion part 354 divides the number of clocks by the cycle constant 12, and sends its value as the converted clock X to the comparator 356.

The comparator 356 compares the number of instructions executed in the virtual lesser performance machine with the converted clock X and sends the comparison result to the wait timing controller 358.

The wait timing controller 358 decides the frequency at which the wait is inserted into the instructions in the virtual lesser performance machine, based on the comparison result. If the insertion frequency of wait is higher, the emulate speed in the virtual lesser performance machine is slower, or if the frequency is lower, the emulate speed is faster. If the wait is not inserted, the emulation is made at the highest speed. In this manner, the emulate speed is adjusted by the insertion frequency of wait into the instructions in the virtual lesser performance machine, whereby the more correct emulation is enabled.

The length of wait itself is necessary to be longer than the time required deciding the insertion frequency of wait, and is equivalent to about 100 cycles (0.23 µs) of the operating clock 440 MHz for the higher performance machine in this embodiment. In this manner, a deviation between the intrinsic execution timing and the actual execution timing of instruction can be suppressed by making the adjustment at smaller timings, whereby the nonconformity due to the deviation in the execution timing is prevented.

The details of the operation in the wait timing controller 358 will be described in the paragraph of operational form as follows.

<Operational Form>

The operation of the higher performance machine in this embodiment will be described below. At the boot-up time of the higher performance machine, it is discriminated whether the media 200 in the drive is intended for the higher performance machine or the lesser performance machine through the media decoder 130, upon turning on the power of the higher performance machine or the like. This discrimination is enabled by recording a type code indicating whether the type is for the higher performance machine or the lesser performance machine in a first area of the media 200 firstly read into the entertainment apparatus, reading the type code and referring to a media type register (not shown) within the media decoder 130. As a result of discrimination, if the media 200 is for the higher performance machine, the higher performance machine is booted in the normal mode. If there is nothing in the drive, the same operation is performed. On the other hand, if the media 200 in the drive is for the lesser performance machine, the higher performance machine is booted in the emulation mode.

In the emulation mode, the ROM 150 is read, and the virtual CPU 320 corresponding to the CPU 220 of the lesser performance machine and the software clock 345 for generating the clock, to which the virtual CPU 320 refers to, are formed in the EP memory 170 of the higher performance machine, as shown in FIG. 3. The software clock generates the software clock in the virtual lesser performance machine by referring to the clock supplied from the clock generator 145. Also, the SPU 140 that is hardware of the higher performance machine operates like the SPU 240 of the lesser performance machine.

Moreover, the speed controller 350 is constructed in the main memory 160 to adjust the emulate speed. Thereby, the virtual lesser performance machine is emulated. In FIG. 3, the main memory 270 of the lesser performance machine, the controller 280 and the like are omitted, but a partial area of the EP memory 170 and the controller 180 of the higher performance machine may be employed, as described above.

In the emulation of the virtual lesser performance machine, after the number of instructions decided at the previous time of wait (indicated by "a" in the figure), 30 instructions in this example, are executed, the wait is inserted again (indicated by "b" in the figure) and the number of instructions to be executed by the next time of inserting the wait is decided. In this example, the length of wait itself is 100 cycles of the operating clock 440 MHz for the higher performance machine, namely, about 0.23 μs. The speed controller 350 adjusts the insertion frequency of wait by deciding the number of instructions to be executed by the next time of inserting the wait during the wait as indicated by "b" in FIG. 5, and adjusts the instruction execution timing. The insertion frequency of wait is higher by reducing the number of instructions to be executed by the time of inserting the wait, so that the emulation speed is slower. By increasing the number of instructions to be executed by the time of inserting the wait, the insertion frequency of wait is lower, so that the emulation is performed faster.

Though it is preferred that the length of wait itself is shorter, it is required that the length of wait is longer than the maximum value of the time required to decide the insertion frequency of wait, whereby the maximum calculation time for deciding the insertion frequency of wait may be the length of wait itself. In this embodiment, the virtual CPU 320 is constructed to have the scheduler function, in which the wait is an overhead itself by a call back of the scheduler function. The wait time length in this case was about 100 cycles (0.23 μs) of the operating clock 440 MHz for the higher performance machine.

In this manner, if the insertion frequency of wait is changed by shortening the time of wait itself, the emulation speed can be adjusted at smaller timings. Accordingly, a deviation between the intrinsic execution timing and the actual execution timing of instruction can be suppressed, whereby the nonconformity due to the deviation in the execution timing is prevented.

The instruction number detector 352 of the speed controller 350 as shown in FIG. 4 counts the actual number of clocks from the clock generator 145 of the higher performance machine in a period (period P in FIG. 5) from the previous time of wait insertion (as indicated by "a" in FIG. 5) to the completion of executing 30 instructions in the virtual lesser performance machine, and sends the number of instructions, 30 in this case, executed by the virtual lesser performance machine while the wait is applied (as indicated by "b" in FIG. 5), to the comparator.

Figure 5:
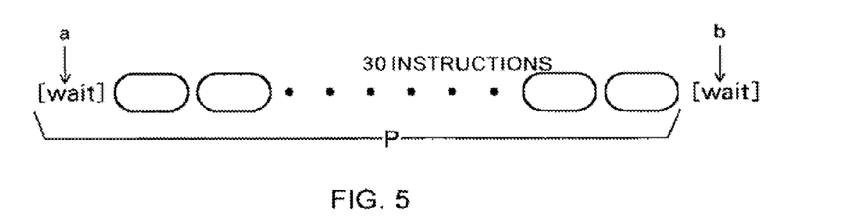
FIG. 5 is an explanatory diagram for the wait insertion timing.

Also, the actual number of clocks from the clock generator 145 for the higher performance machine in the period P, which is counted by the instruction number detector 352, is sent to the clock conversion part 354.

The clock conversion part 354 calculates the converted value X corresponding to the number of instructions in the virtual lesser performance machine by dividing the value of the actual number of clocks by the cycle constant 12 described above, and sends the obtained converted value X to the comparator 356.

Figure 6:
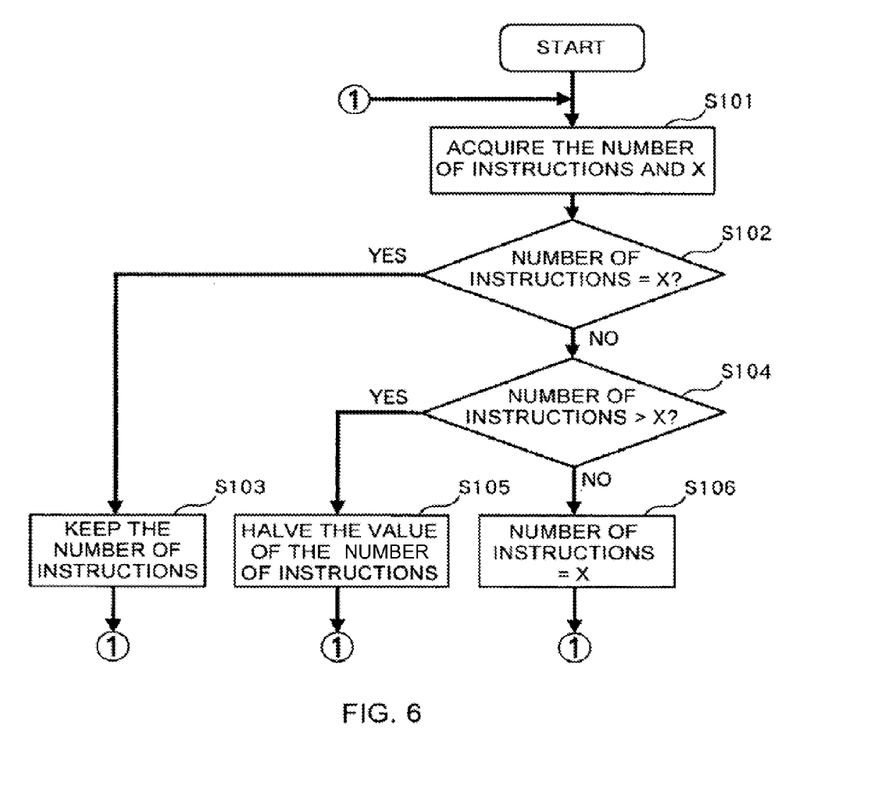
FIG. 6 is a flowchart showing a process for deciding the number of instructions at the next time based on the number of sent instructions and the value of converted clock X.

The comparator 356 compares the number of instructions in the virtual lesser performance machine that is sent from the speed controller 350 with the converted value X in accordance with a flowchart as shown in FIG. 6. First of all, the comparator 356 acquires the number of instructions executed by the virtual lesser performance machine and the converted value X (S101). Then, it is judged whether or not the value of the number of instructions executed by the virtual lesser performance machine is equal to the converted value X (S102). Herein, if the emulation speed in the virtual lesser performance machine is equal to the operation speed of the lesser performance machine as the actual machine, the number of instructions in the virtual lesser performance machine=number of clocks in the virtual lesser performance machine=converted value X.

For example, in a case where the actual number of clocks in the period P counted by the instruction number detector 352 is 360, the converted value X=360/12=30. In this manner, if the number of executed instructions in the virtual lesser performance machine is equal to the converted value X (Y at S102); the virtual lesser performance machine is instructed to insert the wait again after 30 instructions. In this embodiment, it is instructed to insert the wait after 30 instructions using the call back function.

If the number of instructions in the virtual lesser performance machine is not equal to X (N at S102), it is judged whether or not the number of instructions in the virtual lesser performance machine is greater than X (S104). For example, in a case where the actual number of clocks from the clock generator 145 of the higher performance machine in the period P, which is counted by the instruction number detector 352, is 288, the converted value X=288/12=24. Accordingly, the number of instructions in the virtual lesser performance machine>X. In this manner, if the number of instructions in the virtual lesser performance machine is greater than X (Y at S104), 30 instructions are executed for the period of time in which 24 instructions are essentially executed, that is, the emulation is made faster than normally. Accordingly, to decrease the emulation speed, the number of instructions to be executed before insertion of the wait is reduced, whereby the insertion frequency of wait is made higher. In this embodiment, the number of instructions to be executed by the virtual lesser performance machine by the time of wait insertion is multiplied by K (0<K<1), and made smaller than the original value. In this example, K is equal to 0.5. Accordingly, in this example, the number of instructions in the virtual lesser performance machine is changed from 30 to 15, whereby the virtual lesser performance machine is instructed to insert the wait after 15 instructions. In this embodiment, it is instructed to insert the wait after 15 instructions using the call back function.

If the number of instructions in the virtual lesser performance machine is not greater than X (N at S104), the number of instructions in the virtual lesser performance machine is less than X, because it is already judged that the number of instructions in the virtual lesser performance machine is not equal to X at S102. For example, in a case where the actual number of clocks from the clock generator 145 of the higher performance machine in the period P, which is counted by the instruction number detector 352, is 420, the converted value X=420/12=35. In this case, 30 instructions are only executed for the period of time in which 35 instructions are essentially executed, that is, the emulation is made slower than normally. Accordingly, to increase the emulation speed, the number of instructions to be executed in the virtual lesser performance machine before insertion of the wait is increased, whereby the insertion frequency of wait is reduced. The number of instructions in the virtual lesser performance machine may be multiplied by L (1<L), and made larger than the original value of the number of instructions in the virtual lesser performance machine. However, since the number of instructions in the virtual lesser performance machine is less than X in this example, the value of the number of instructions in the virtual lesser performance machine is replaced with the value of X. Accordingly, the number of instructions in the virtual lesser performance machine is changed from 30 to 35 in this example, whereby the virtual lesser performance machine is instructed to insert the wait after 35 instructions. In this embodiment, it is instructed to insert the wait after 35 instructions using the call back function.

With the above configuration, if the emulation speed is slower than the intrinsic execution speed of the lesser performance machine, the insertion frequency of wait is reduced to speed up the emulation. Also, if the emulation speed is faster than the intrinsic execution speed, the insertion frequency of wait is increased to slow down the emulation.

Also, the adjustment of the emulation speed is made by adjusting the frequency of inserting the wait having a very short fixed length. In this example, it is adjusted in the length of about 100 clocks (about 0.23 µs) of the operating clock 440 MHz for the higher performance machine. For example, when the wait is inserted in a unit of one frame (1/60 seconds) as in the prior art, a hardware interrupt process, a register access process and the like is greatly delayed, whereby there is a risk that the emulation is not normally performed. On the other hand, the emulation speed is adjusted in a unit of one clock for the lesser performance machine that is the emulation object apparatus in this embodiment. In this manner, the emulation speed can be adjusted by adjusting the insertion frequency of wait having a very short time without substantially obstructing the hardware interrupt process or the register access process.

If it takes a long time for deciding the insertion frequency of wait, the emulation speed is slower as a result. Accordingly, a process for newly deciding the number of instructions at S103, S105 and S106 is required to make no complex calculation. In this embodiment, since the number of instructions is directly maintained at S103, it does not take a long time to make the decision. Also, since the number of instructions is decided by simply halving the number of instructions (e.g., making one bit shift in binary representation) at S105, it does not take a long time to make the decision. Moreover, the number of instructions is decided by simply equalizing the number of instructions to X at S106, whereby the decision is made in a short time.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An emulator for executing, using a computer processor, an instruction stream consisting of a plurality of instructions included in an application (hereinafter an "object application") for an apparatus to be emulated (hereinafter an "object apparatus") to perform said object application, in which said object apparatus performs successively the instructions included in said instruction stream at a predetermined period, said emulator comprising a speed controller for adjusting the emulation speed by emulating execution of said instruction stream by said object apparatus and intermittently inserting a wait into said instruction stream to emulate execution of said instruction stream, wherein said emulator comprises a scheduler function execution part for performing a process of an emulator main body by making a call back during the execution of the instruction stream for said object application to stop the execution of the instruction stream for said object application, and if the wait is inserted by said speed controller, said scheduler function execution part makes said call back to stop the execution of the instruction stream for said object application.

2. The emulator according to claim 1, wherein said emulator emulates a plurality of devices included in said object apparatus, said devices to be emulated including a first emulated device operating in a predetermined operating clock system and a second emulated device operating in a clock system different from said predetermined clock system, and said speed controller adjusts the emulation speed for said first emulated device and said second emulated device.

3. The emulator according to claim 2, comprising a memory, in which said first emulated device is emulated by software within said memory, and a hardware emulator for emulating said second emulated device by hardware.

4. The emulator according to claim 1, wherein said speed controller compares the emulation speed of the instruction stream by the object apparatus with an intrinsic execution speed of the object application in the object apparatus, while said wait is applied, and adjusts said emulation speed by deciding an insertion frequency of wait based on its comparison result.

5. The emulator according to claim 4, wherein said emulator comprises a clock generator, said speed controller being able to count clock input from said clock generator, and said speed controller acquires the time required for said object apparatus to execute the instruction executed from a previous time of wait insertion to a present time of wait insertion, and adjusts said emulation speed, based on the acquired time and the time taken to emulate said instruction obtained from the count number of clocks input from said clock generator.

6. The emulator according to claim 1, wherein when the wait is inserted upon said call back, a number of instructions to be executed by the next time of wait insertion in the execution of said instruction stream is decided.

7. An emulating method performed by an emulator having a speed controller, said method comprising executing an instruction stream consisting of a plurality of instructions included in an application (hereinafter an "object application") for an apparatus to be emulated (hereinafter an "object apparatus") to perform said object application, and inserting a wait intermittently into said instruction stream to emulate execution of said instruction stream thereby adjusting the emulation speed, the method further comprising making a call back during the execution of the instruction stream for said object application to stop the execution of the instruction stream for said object application, and if the wait is inserted, making said call back stop the execution of the instruction stream for said object application.

* * * * *